United States Patent
Demarchi et al.

(10) Patent No.: US 7,324,190 B2
(45) Date of Patent: Jan. 29, 2008

(54) SYSTEM FOR VISUALIZATION OF OPTICAL MARKING ON AN OPHTHALMIC LENS, STAMP-MARKING DEVICE AND METHOD FOR ORIENTATION OF LENSES USING SUCH A SYSTEM

(75) Inventors: Henri Dominico Demarchi, La Motte Servolex (FR); Joseph Naccarato, Sales (FR)

(73) Assignee: TECOPTIQUE, Chambery (FR)

( * ) Notice: Subject to any disclaimer, the term of this patent is extended or adjusted under 35 U.S.C. 154(b) by 273 days.

(21) Appl. No.: 10/552,584

(22) PCT Filed: Apr. 5, 2004

(86) PCT No.: PCT/FR2004/000843

§ 371 (c)(1),
(2), (4) Date: Oct. 12, 2005

(87) PCT Pub. No.: WO2004/091858

PCT Pub. Date: Oct. 28, 2004

(65) Prior Publication Data
US 2006/0114449 A1  Jun. 1, 2006

(30) Foreign Application Priority Data
Apr. 14, 2003  (FR) .................... 03 04654

(51) Int. Cl.
*G01B 9/00* (2006.01)

(52) U.S. Cl. ................................ 356/124; 356/126
(58) Field of Classification Search ............... 356/124, 356/124.5, 126
See application file for complete search history.

(56) References Cited

U.S. PATENT DOCUMENTS

| 3,737,238 A | 6/1973 | Reiner et al. |
| 4,283,139 A | 8/1981 | Swope |
| 5,894,348 A | 4/1999 | Bacchi et al. |
| 6,088,089 A * | 7/2000 | Reis .................... 356/124 |

FOREIGN PATENT DOCUMENTS

| FR | 2 115 966 | 7/1972 |
| FR | 2 475 222 | 8/1981 |
| SU | 511520 | 9/1976 |

* cited by examiner

*Primary Examiner*—Roy M. Punnoose
(74) *Attorney, Agent, or Firm*—Oliff & Berridge, PLC

(57) ABSTRACT

The system comprises a light source, supplying an incident light beam illuminating the ophthalmic lens. On the optical path of the incident beam, reflecting means are arranged downstream from the ophthalmic lens and a collimation and magnifying lens is arranged upstream from the ophthalmic lens. A camera, the lens, the ophthalmic lens and the reflecting means are arranged on the same main optical axis. The reflecting means comprise a plurality of flat reflecting faces, arranged in the form of at least one cube corner block open in the direction of the ophthalmic lens. The flat faces can form a matrix of adjacent cube corner blocks made of plastic.

14 Claims, 8 Drawing Sheets

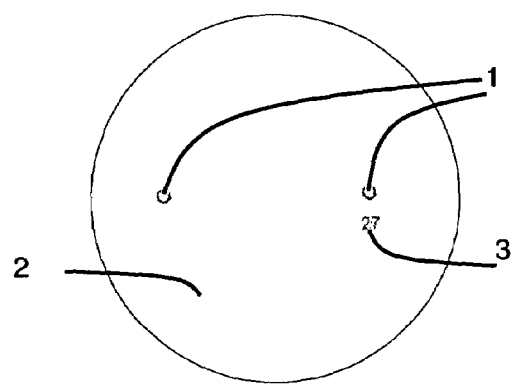
Figure 1 (Prior Art)
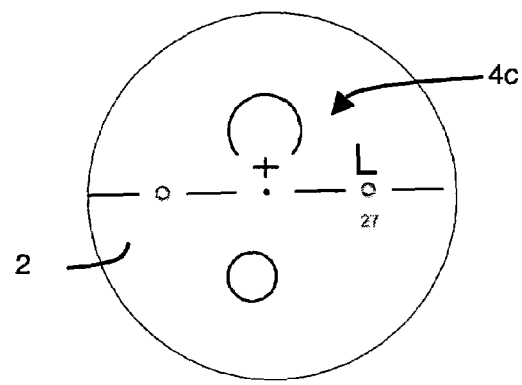
Figure 2 (Prior Art)
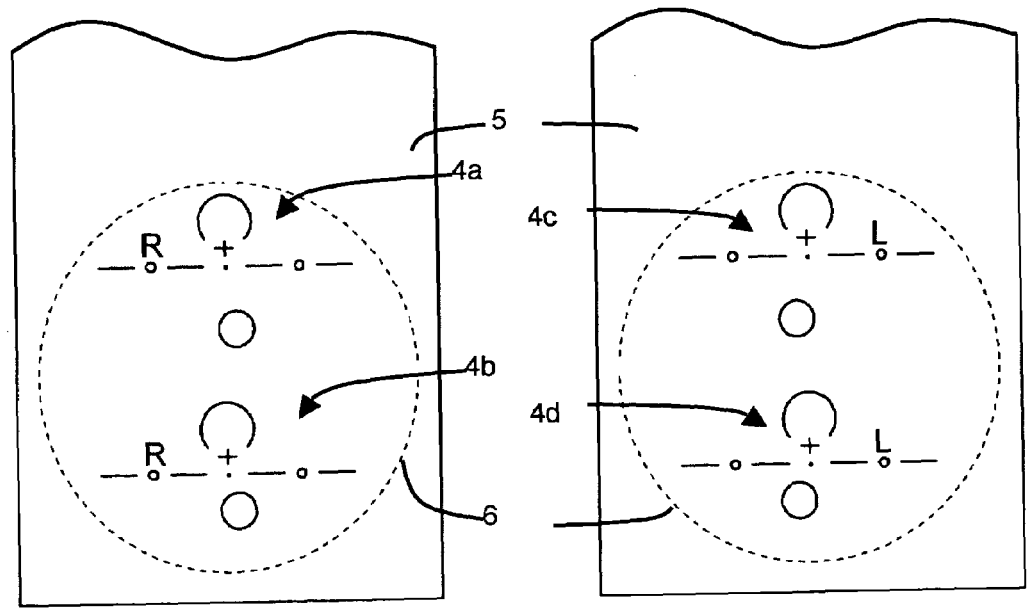
Figure 3 (Prioir Art)

SYSTEM FOR VISUALIZATION OF OPTICAL MARKING ON AN OPHTHALMIC LENS, STAMP-MARKING DEVICE AND METHOD FOR ORIENTATION OF LENSES USING SUCH A SYSTEM

BACKGROUND OF THE INVENTION

The invention relates to a system for visualisation of optical markings of an ophthalmic lens, comprising
- a light source supplying an incident light beam illuminating the ophthalmic lens,
- on the optical path of the incident beam, reflecting means arranged downstream from the ophthalmic lens and a collimation and magnifying lens arranged upstream from the ophthalmic lens,
- a camera, the lens, the ophthalmic lens and the reflecting means being arranged on the same main optical axis.

STATE OF THE ART

Conventionally, a laboratory machining progressive ophthalmic lenses uses semi-finished ophthalmic lenses, i.e. ophthalmic lenses the progressive convex face whereof is finished and polished, to machine the concave face of the ophthalmic lenses in order to obtain the final corrective powers. Before machining, the initial marking of the manufacturer, stamped on the convex face, is used to index the ophthalmic lens. After machining, the ophthalmic lens is washed and can be subjected to several treatments such as hardening, anti-glare, etc . . . . The initial marking then has to be erased. After treatment, the ophthalmic lens has to be marked again.

As a general rule, the operator looks for the micro-etchings 1, represented in FIG. 1, characteristic of an ophthalmic lens 2, and makes a dot with a felt-tip pen on the two micro-etchings 1. These two micro-etchings are generally two circles presenting a constant distance between axes of 34 mm. An addition 3 representative of certain properties of the ophthalmic lens is also inscribed next to one of the two circles. Certain manufacturers add other lens identification micro-etchings, for example a number, a barcode, a dot-code, etc . . . . The operator then positions the ophthalmic lens 2 manually on a stamp-marking machine and launches the stamp-marking process. During stamp-marking, represented in FIGS. 2 and 3, a pattern 4c is deposited on the ophthalmic lens 2. Two patterns 4a and 4b, corresponding to a right ophthalmic lens, and two patterns 4c and 4d, corresponding to a left ophthalmic lens, are etched respectively with specific grooves in left and right engraving block supports 5, generally made of steel or ceramic. The pattern 4c to be deposited is transposed by means of an ink container and a stamp which recovers the ink stored in the groove of the engraving block (4c) and deposits it on the ophthalmic lenses 2. The circles in broken lines 6 correspond to the position of the ink container at rest.

An optician who receives ophthalmic lenses uses the stamp-marking to index the ophthalmic lens and close-cut it according to the shape of the frame. Once the ophthalmic lens has been close-cut and fitted, the stamp-marking is removed with alcohol.

Marking an ophthalmic lens with a felt-tip pin has the drawback of not being very precise and, for example, of leading to parallax errors.

OBJECT OF THE INVENTION

It is an object of the invention to remedy these drawbacks and, in particular, to enable the optical markings of an ophthalmic lens to be located precisely and quickly.

According to the invention, this object is achieved by the fact that the reflecting means comprise a plurality of flat reflecting faces, arranged in the form of at least one cube corner block open in the direction of the ophthalmic lens.

According to a development of the invention, six flat reflecting faces, formed by mirrors, are arranged in the form of two cube corner blocks, arranged on each side of the main optical axis.

According to another development of the invention, the flat reflecting faces, in the form of cube corner blocks, form a matrix of adjacent cube corner blocks.

According to another feature of the invention, the system comprises a tinted lens arranged on the main optical axis, between the lens and the ophthalmic lens.

According to a preferred embodiment, the system comprises rotation means for making the reflecting means rotate around the main optical axis.

It is also an object of the invention to provide a device for stamp-marking ophthalmic lenses comprising at least one inking unit, a stamp-marking unit and at least one visualisation system according to the invention.

It is a further object of the invention to provide a method for orienting ophthalmic lenses, comprising placing of an ophthalmic lens on a support and adapting the position of the ophthalmic lens by means of optical markings visualised by at least one visualisation system according to the invention.

BRIEF DESCRIPTION OF THE DRAWINGS

Other advantages and features will become more clearly apparent from the following description of particular embodiments of the invention given as non-restrictive examples only and represented in the accompanying drawings, in which:

FIGS. 1 and 2 represent an ophthalmic lens respectively before and after stamp-marking.

FIG. 3 shows etched left and right engraving blocks each comprising two different patterns.

DESCRIPTION OF PARTICULAR EMBODIMENTS

Figure 4:
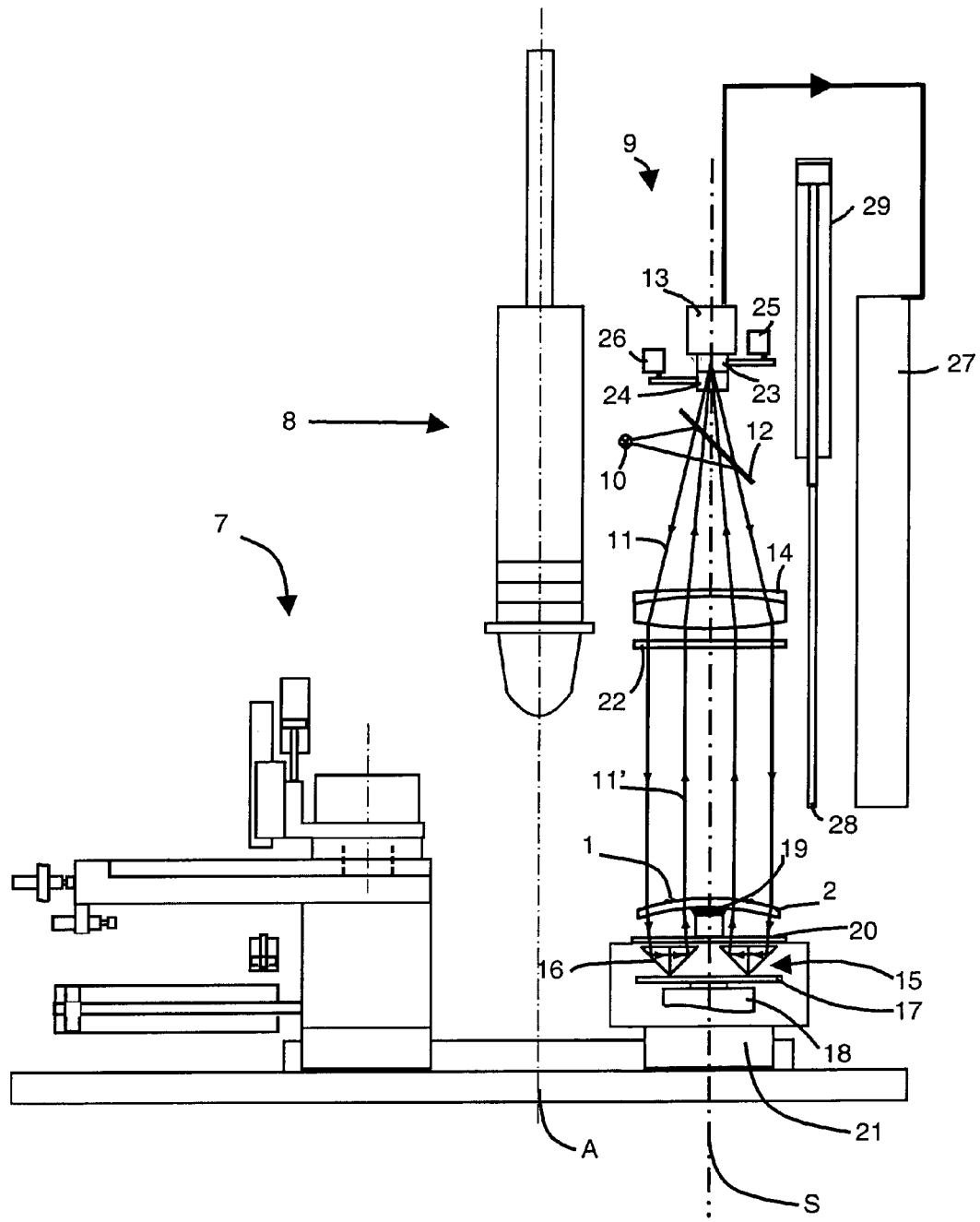
FIG. 4 represents a stamp-marking device comprising a visualisation system according to the invention.

In FIG. 4, a stamp-marking device comprises an inking unit 7, a stamp-marking unit 8 and a visualisation system 9 of optical markings, for example micro-etchings 1, of an ophthalmic lens 2. A light source 10, for example formed by a light-emitting diode, is arranged next to a main optical axis S and supplies an incident light beam 11 that illuminates the ophthalmic lens 2 by means of semi-reflecting means 12 arranged on the main optical axis S between a camera 13 and a collimation and magnifying lens 14. The semi-reflecting means 12 reflect the incident light beam 11 in the direction of the ophthalmic lens 2 and transmit a detection beam 11' originating from the ophthalmic lens 2 in the direction of the camera 13. It is advantageous for the camera 13 to be of the high-resolution 795 (H)×596 (V) Charge Coupled Device (CCD) type. An Automatic Gain Control (AGC) camera is preferably chosen in order to preserve a single integration time (exposure time of the photosensitive cells).

The semi-reflecting means 12 can be formed, for example, by a semi-reflecting mirror, oriented at 45° with respect to the main optical axis S, or by a semi-reflecting cube. However the semi-reflecting mirror is more advantageous for reducing optical aberrations and is less bulky. The collimation and magnifying lens 14 can for example be a flat-convex lens or an achromatic lens enabling spherical aberration to be minimised.

On the optical path of the incident beam 11, reflecting means 15 are arranged downline from the ophthalmic lens 2 whereas the collimation and magnifying lens 13 is arranged upline from the ophthalmic lens 2. The camera 13, lens 14, ophthalmic lens 2 and reflecting means 15 are arranged on the same main optical axis S. The reflecting means 15 comprise a plurality of flat reflecting faces 16 arranged in the form of cube corner blocks open in the direction of the ophthalmic lens 2. The flat reflecting faces 16 can be formed by mirrors. In FIG. 4, two cube corner blocks, arranged on each side of the main optical axis S, are formed by six flat reflecting faces 16 formed by mirrors.

The reflecting means 15 are fixed, for example stuck, onto a securing disk 17 fixedly secured to a motor 18 forming rotation means enabling the reflecting means 15 to be rotated around the main optical axis S. Balancing of the reflecting means 15 and disk 17 with respect to the motor 18 is indispensable for vibration-free rotation. The motor 18, having a rotation frequency typically comprised between 700 and 3000 rpm, enables the lighting of the image to be homogenized during the integration time of the camera 13. It also contributes to suppressing the edges of the cube corner blocks from the image.

The ophthalmic lens 2 is held by a fixing suction pad 19 which is connected to a carriage 21. A transparent protective plate 20 is arranged between the ophthalmic lens 2 and the reflecting means 15 for the purposes of protecting the reflecting means 15. The protective plate 20 is preferably toughened and anti-glare treated on both faces. The suction pad 19 typically has a diameter of 20 mm and enables the ophthalmic lens 2 to be held by negative pressure during stamp-marking. The material of the suction pad 19 does not leave any trace on the concave face of the lenses. The assembly formed by the motor 18 and reflecting means 15 on the one hand, and the ophthalmic lens 2, suction pad 19 and protective plate 20 on the other hand, can be driven by the carriage 21, enabling the ophthalmic lens 2 to be moved between a marking position facing a marking axis A and a visualisation position facing the main optical axis S.

The visualisation system 9 preferably comprises a tinted lens 22 arranged on the main optical axis S between the lens 14 and the ophthalmic lens 2. The tinted lens 22 can be a lens of sun-glass type or a polarizing lens. It enables the lighting to be reduced in order not to saturate the camera 13 and therefore to keep an optimum integration time whatever the ophthalmic lens 2 used. The tinted lens 22 also contributes to suppressing the edges of the cube corner blocks from the image.

The lens of the camera 13 must be situated at the focal point on the image side of the lens 14 to avoid vignetting and to thus preserve a good photometric efficiency. The lens of the camera 13 comprises means 23 for adjusting the focussing and means 24 for adjusting the opening of the iris. Adjustment of the iris and of the focussing can be performed remotely by means of two servomotors, one servomotor 25 for focussing and one servomotor 26 for adjustment of the opening of the iris. A minimum opening of the iris is preferable to have a better definition. The light-emitting diode constituting the light source 10 can have a wavelength of about 650 nm and illuminate with a reduced diffusion angle. However it does require a diaphragm to adjust the light beam precisely. In addition, the diode can be adjustable in intensity. It is preferable to have a powerful lighting in order to use a minimum iris opening.

The stamp-marking device, represented in FIG. 4, also comprises a monitor 27, for example a liquid crystal display, connected to the camera 13, and a safety gate 28 able to be raised and lowered by an actuator 29. t is preferable to use a camera 13 supplied in 5 VDC and a monitor 27 supplied in 12 VDC to eliminate stray signals.

Figure 5:
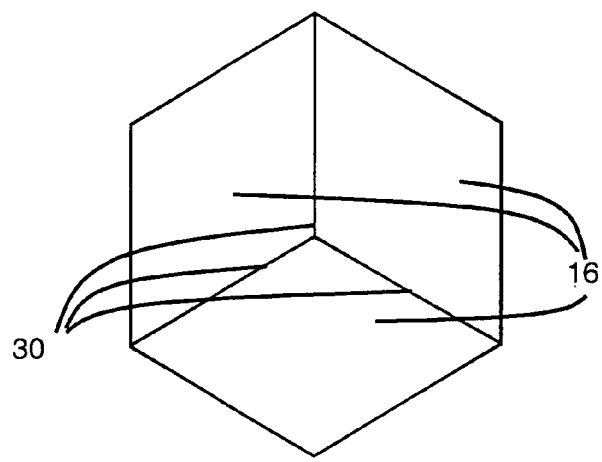
FIGS. 5 and 6 represent cube corner blocks respectively in bottom view and in top view.
Figure 6:
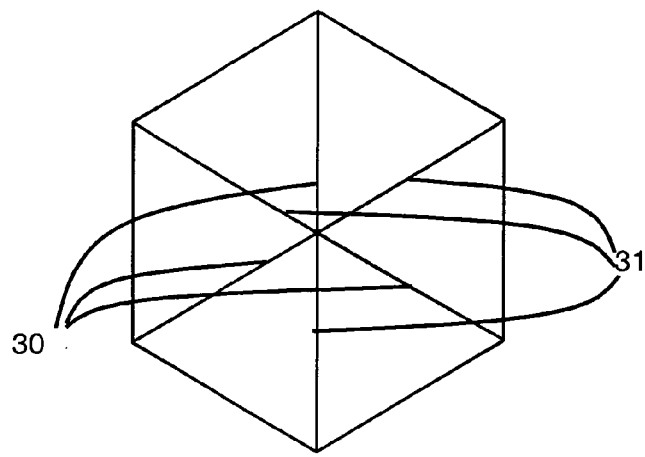

In FIG. 5, a bottom view of a cube corner block enables the three edges 30 of the three faces 16 of the cube corner block to be distinguished, whereas in FIG. 6, in top view, each of the three reflections 31 of each edge 30 in the respectively opposite face 16 can also be seen.

Figure 7:
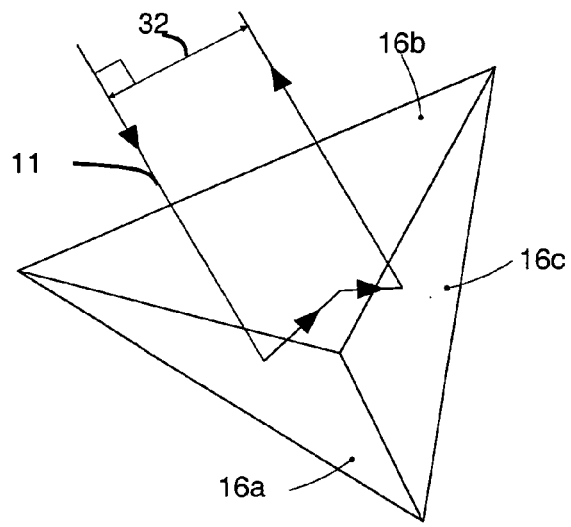
FIG. 7 represents the functioning of a cube corner block.

As represented in FIG. 7, an incident light beam 11 is reflected by a flat reflecting face 16a in the direction of a second flat face 16b reflecting light to the third flat face 16c, the latter reflects light in a direction parallel to the incident beam 11, but on an optical path offset with respect to the incident beam 11. The spatial offset 32 depends on the position and direction of the incident beam 11 and can be at the maximum about the dimension of the cube corner block. The cube corner block inverts an image composed of several incident beams 11.

Figure 8:
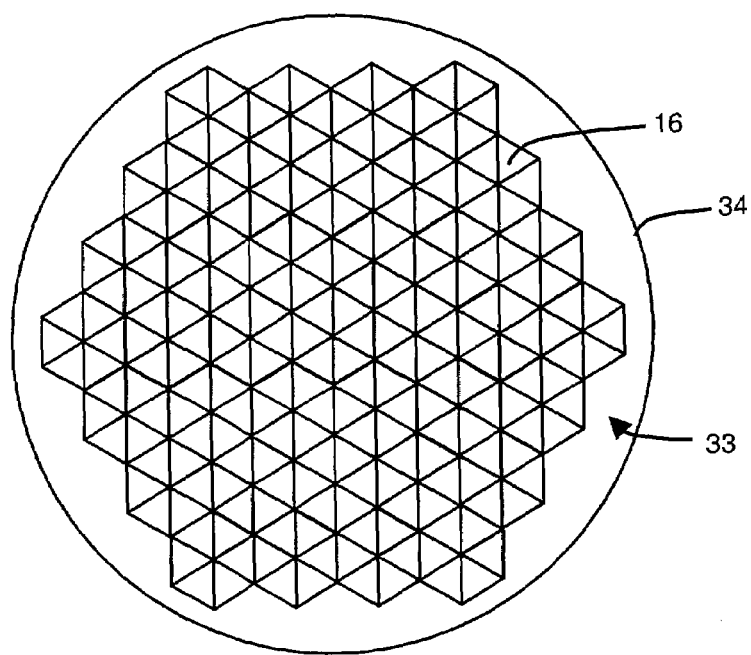
FIG. 8 illustrates, in top view, a particular embodiment of the reflecting means of a system according to the invention.

In FIG. 8, a matrix 33 of adjacent cube corner blocks is arranged on a support 34. The flat reflecting faces 16 are constituted by solid cube corner blocks made of plastic, for example moulded plastic. The flat reflecting faces can also be formed by hollow cube corner blocks made of plastic or by cube corner blocks machined in a metal support. A matrix 33 of adjacent cube corner blocks enables the visualisation system 9 to be made insensitive to the optical power of the ophthalmic lens 2 used.

Figure 9:
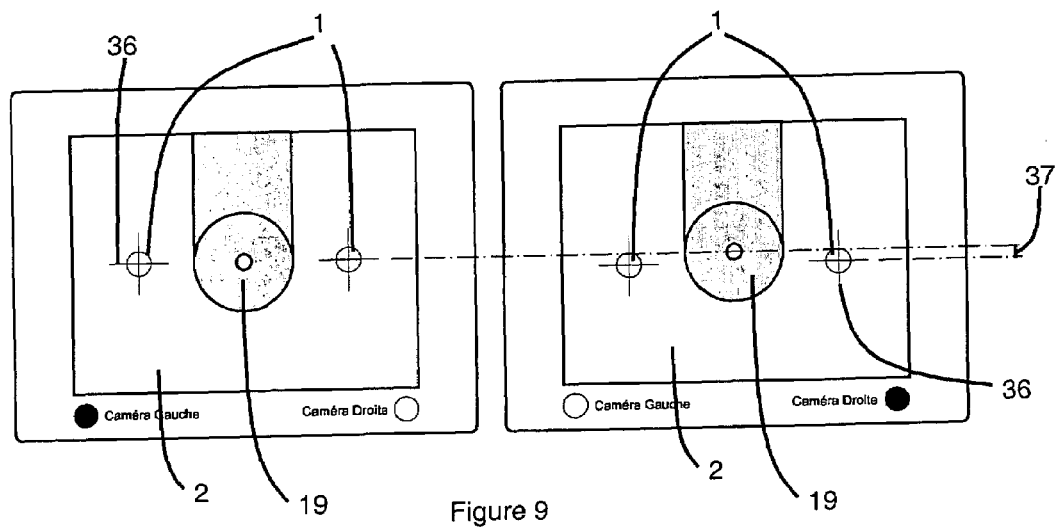
FIG. 9 shows a monitor image corresponding to a left camera and a right camera of a device according to the invention.

FIG. 9 represents the image that can be displayed on the monitor 27. The stamp-marking device can comprise two visualisation systems 9, respectively for a right ophthalmic lens 2 and a left ophthalmic lens. Thus, the images from two cameras 13 can be displayed alternately on the monitor 27, or simultaneously in the case where the device comprises two monitors. Each image represents an ophthalmic lens 2, micro-etchings 1 and the support means of the ophthalmic lenses 2, for example the suction pads 19. On the monitor screen, indexing marks 36 are marked, enabling each ophthalmic lens to be oriented by means of the micro-etchings 1 and marks 36.

To orient the ophthalmic lens 2, the operator places the lens on the fixing suction pad 19 and rotates the lens slightly until he sees on the screen the micro-etchings 1 having a distance of 34 mm between axes. He positions the two micro-etchings 1 perfectly in the indexing marks and creates a vacuum to fix the ophthalmic lens onto the fixing suction pad 19.

However, the grooves of the patterns 4 are never etched at the right distance with respect to a reference point of the engraving block supports 5. A software can then be used which enables the indexing marks 36 to be inserted on the screen and which stores its own indexing marks for each engraving block. The positions of the left and right marks 36, represented in FIG. 9, present a vertical offset 37, which is taken into account on by means of the software used for image processing. To calibrate the stamp-marking device, the operator records a reference of the set of patterns 4 etched on the engraving block supports 5. He runs the stamp-marking procedure and visualises the marked ophthalmic lens on the screen of the monitor 27. Then, for example simply by means of a computer mouse, he superposes the indexing marks. 36 on the stamp-marked circles, with a distance of 34 mm between axes, to locate the micro-etchings 1. Different sets of engraving blocks can thus be used using the calibration and references of the sets of engraving blocks without calibrating after each change of set of engraving blocks.

Operation of the visualisation system 9 thus consists in achieving an image of the surface of the ophthalmic lens 2 comprising the micro-etchings 1 on a matrix CCD camera. However, the micro-etchings 1 are not non-homogeneities modulated in transmission, like for example printed images, but phase non-homogeneities. Their contrast is therefore low if they are observed without using their diffraction properties. For this, the ophthalmic lens 2 is preferably illuminated with a collimated light. To do this, a light source 10 filtered by a diaphragm situated at the focal point of the lens 14 can be used. Moreover, to be as free as possible from dependency on non-collimated ambient light, a narrow spectrum light-emitting diode can be used and a filter centred on its wavelength be placed after the lens 14. The beam thus formed passes through the ophthalmic lens a first time, undergoes reflection by the reflecting means 15, and passes through the ophthalmic lens a second time. It is then focussed at the focal point of the lens 14 where the entry of the lens of the camera 13 is placed.

This enables a maximum of flux to be collected and the lighting on the surface of the camera 13 to be homogenized limiting vignetting. From the imagery point of view, the ophthalmic lens 2 bearing the micro-etchings 1 must be situated at the focal point on the object side of the lens 14. The lens 14 then reflects back the image to infinity, an image that is picked up by the lens of the camera 13 to be formed in the plane of the detector. Focussing adjustment of the lens enables mechanical positioning tolerances to be relaxed. The cube corner blocks constitute the reflecting means 15 enabling the micro-etchings 1 to be visualised on non-zero power lenses. The cube corner blocks in fact reflect back the received beams in a direction parallel to their angle of arrival. Passing through the ophthalmic lens 2 again with the same angle, they are output from it again collimated.

Figure 10:
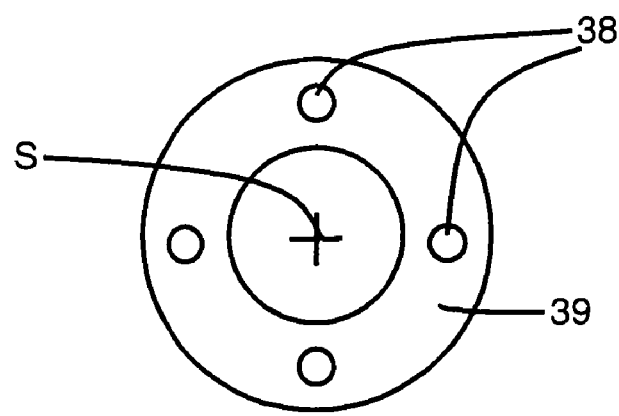
FIG. 10 shows a particular embodiment of a light source.

FIG. 10 represents an alternative embodiment of the light source 10, enabling the semi-reflecting means 12 to be eliminated. The light source is an annular lighting with light-emitting diodes 38, arranged around the main optical axis S, on a support 39 in the form of a ring. The support 39 can be fixed upstream from the collimation and magnifying lens 14, for example at the level of the lens of the camera 13. The light-emitting diodes 38 can also be replaced by optical fibres.

Figure 11:
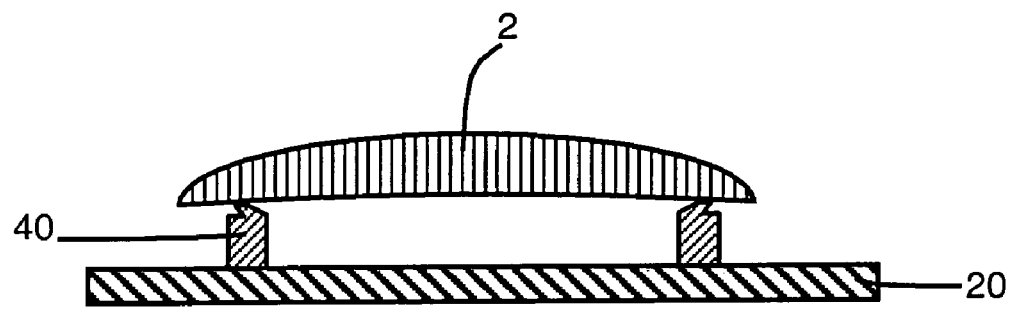
FIG. 11 shows a particular embodiment of an ophthalmic lens support.

FIG. 11 represents an alternative embodiment of the support of the ophthalmic lens. This support is formed by an annular seal 40, for example a seal of V ring type or a toroidal sealing ring, arranged between the ophthalmic lens 2 and the protective plate 20 which also becomes (for this alternative embodiment) the suction pad support. The annular seal 40 typically has a diameter of 50 mm and presents the advantage of being a more stable support means than the suction pad 19.

Figure 12:
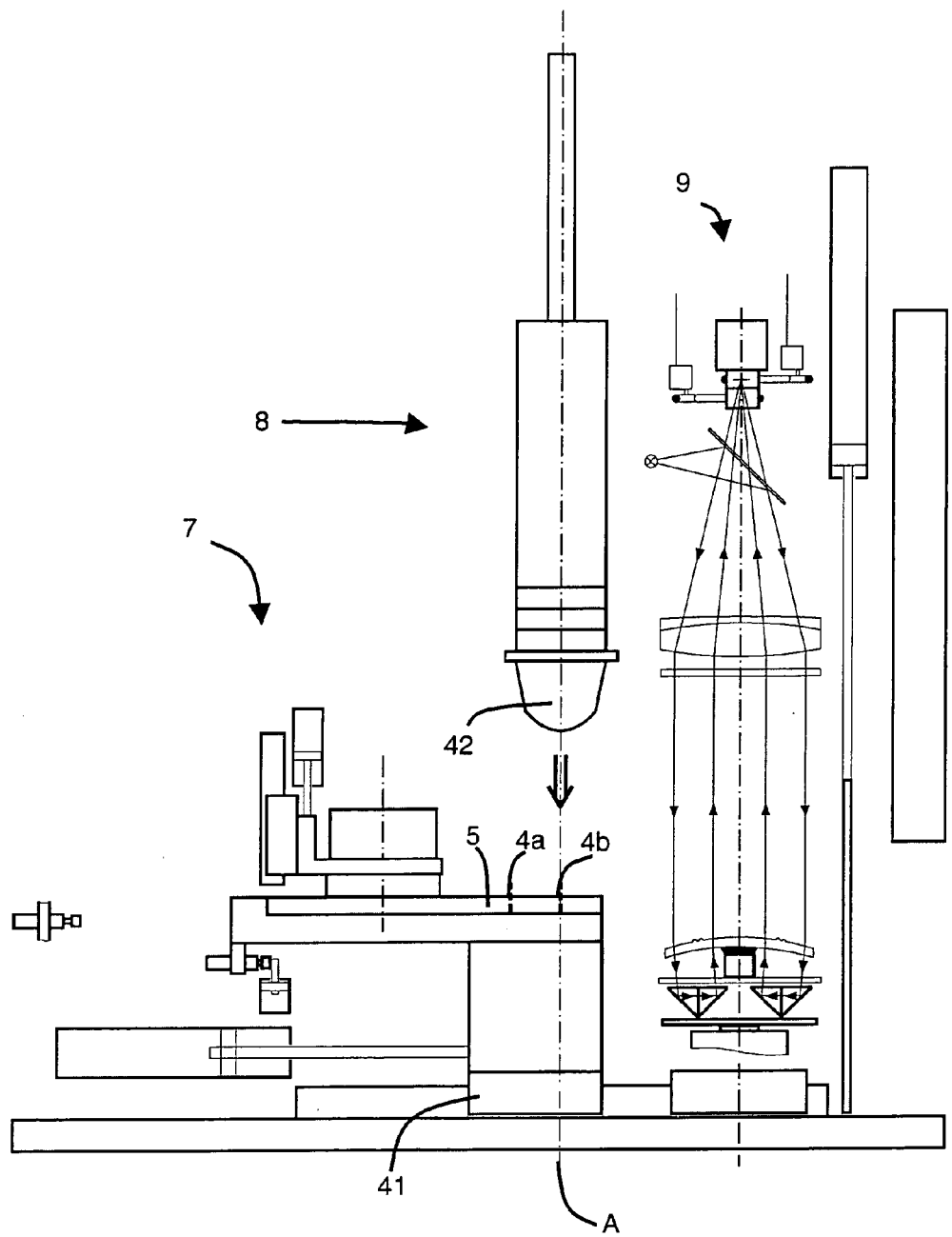
FIGS. 12 to 14 illustrate the stamp-marking method according to the invention.
Figure 13:
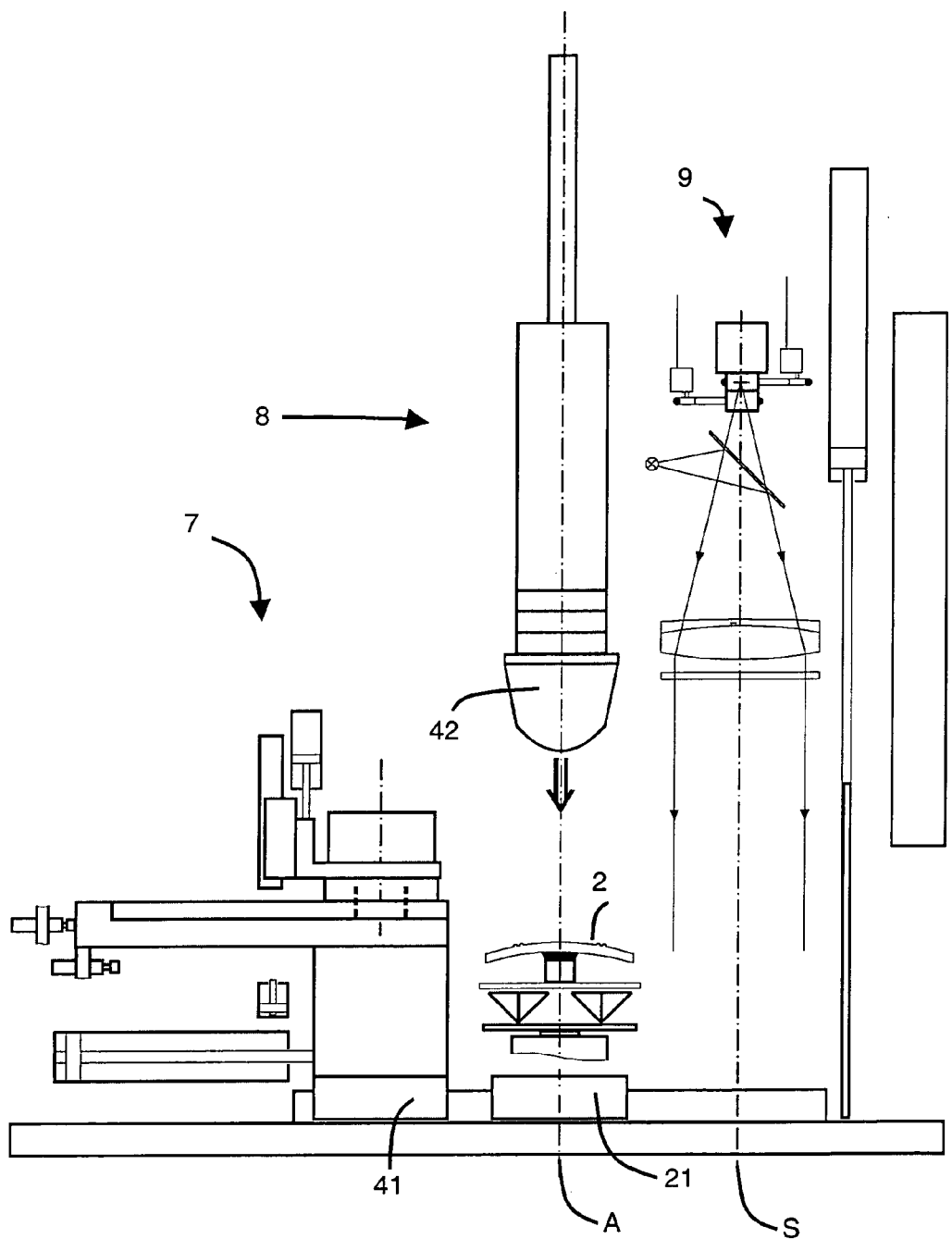

FIGS. 12 and 13 show the steps of a stamp-marking method, performed after a first ophthalmic lens 2 has been positioned by means of the visualisation system 9. In FIG. 12, the engraving block support 5 advances on a linear guiding system 41, so as to position a first pattern 4b under the stamp-marking unit 8, arranged on the marking axis A. As represented by an arrow in FIG. 12, the stamp-marking unit is actuated so that the marking head 42 comes into contact with the first pattern 4b to transfer this pattern to the marking head 42. The engraving block support 5 is withdrawn and the carriage 21 bearing the first ophthalmic lens 2 moves up to the marking axis A. As represented in FIG. 13, the stamp-marking unit is then actuated so that the marking head 42 comes into contact with the first ophthalmic lens 2 to appose the first pattern 4b on the first ophthalmic lens 2.

Preferably, the stamp-marking device comprises two visualisation systems and two stamp-marking units, the inking unit comprising two engraving block supports 5 like, for example, the engraving block supports 5 represented in FIG. 3. This enables simultaneous marking of two ophthalmic lenses, typically a right ophthalmic lens (R) and a left ophthalmic lens (L). The method of stamp-marking a second ophthalmic lens can in fact be performed in the same way as the steps of the previous method. The patterns 4b and 4d are thus simultaneously transferred by the two stamp-marking units respectively onto the right and left ophthalmic lenses.

Figure 14:
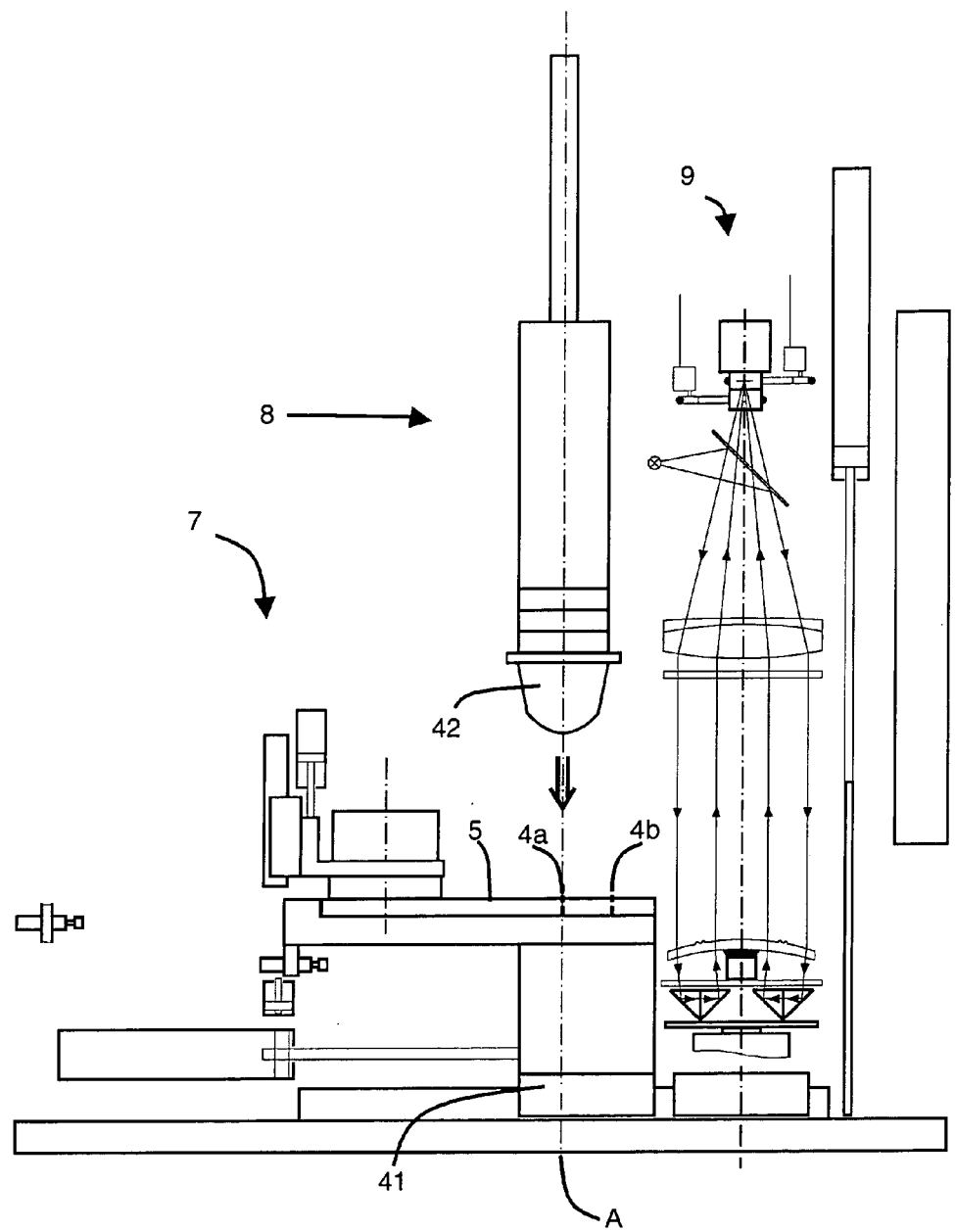

As represented in FIG. 3, the engraving block supports 5 can comprise two different patterns 4a and 4b, intended for different right ophthalmic lenses, and two different patterns 4c and 4d, intended for different left ophthalmic lenses. Thus, the stamp-marking device represented in FIGS. 12 and 13 enables marking of another pair of right and left ophthalmic lenses, requiring a third pattern 4a and a fourth pattern 4c, to be performed using the same pair of engraving block supports 5. In fact, as illustrated in FIG. 14, the engraving block supports 5 are moved so as to position the third pattern 4a opposite the marking head 42. Likewise, the fourth pattern 4c is moved opposite the corresponding marking head.

A device comprising the inking unit 7, the stamp-marking unit 8 and two visualisation systems 9 according to the invention presents reduced dimensions and can be placed on a working surface. The stamp-marking unit has two marking heads, respectively for a right ophthalmic lens and for a left ophthalmic lens. The operator positions the ophthalmic lenses 2 manually on the lens support using two visualisation systems 9, respectively for a right ophthalmic lens and for a left ophthalmic lens. The device is however preferably equipped with a single screen 27, switching from one camera to the other being performed by means of a selector. Such a device enables parallax errors to be prevented and enables the ophthalmic lenses 2 to be stamp-marked with a great precision.

The invention is not limited to the particular embodiments described and represented above. In particular, the visualisation system 9 can be used without performing stamp-marking, but only to identify or orient to then make a check, an additional micro-etching or another operation. The visualisation system 9 is particularly well suited in the case of progressive ophthalmic lens but can also be used for any type of ophthalmic lens.

The invention claimed is:

1. System for visualisation of optical markings of an ophthalmic lens, comprising
    a light source, supplying an incident light beam illuminating the ophthalmic lens,
    on the optical path of the incident beam, reflecting means arranged downstream from the ophthalmic lens and a collimation and magnifying lens arranged upstream from the ophthalmic lens, a camera, the lens, the ophthalmic lens and the reflecting means being arranged on the same main optical axis, system wherein
the reflecting means comprise a plurality of flat reflecting faces, arranged in the form of at least one cube corner block open in the direction of the ophthalmic lens.

2. System according to claim 1, wherein the flat reflecting faces are constituted by solid cube corner blocks made of plastic.

3. System according to claim 1, wherein the flat reflecting faces are constituted by hollow cube corner blocks made of plastic.

4. System according to claim 1, wherein the flat reflecting faces are formed by mirrors.

5. System according to claim 4, comprising six flat reflecting faces formed by mirrors, arranged in the form of two cube corner blocks, arranged on each side of the main optical axis.

6. System according to claim 1, wherein the flat reflecting faces, in the form of cube corner blocks form a matrix of adjacent cube corner blocks.

7. System according to claim 1, comprising a tinted lens arranged on the main optical axis, between the lens and the ophthalmic lens.

8. System according to claim 1, wherein the light source is formed by a light-emitting diode arranged next to the main optical axis, the incident light beam illuminating the ophthalmic lens by means of the semi-reflecting means arranged on the main optical axis, between the lens and the camera.

9. System according to claim 1, wherein the light source comprises several light-emitting diodes, arranged in a ring around the main optical axis, upstream from the lens.

10. System according to claim 1, comprising a transparent protective plate between the ophthalmic lens and the reflecting means and a fixing suction pad arranged between the ophthalmic lens and the protective plate.

11. System according to claim 1, comprising a transparent protective plate between the ophthalmic lens and the reflecting means and an annular seal arranged between the ophthalmic lens and the protective plate.

12. System according to claim 1, comprising rotation means to make the reflecting means rotate around the main optical axis.

13. Device for stamp-marking ophthalmic lenses comprising at least one inking unit, a stamp-marking unit and visualisation means, device wherein the visualisation means are formed by at least one visualisation system according to claim 1.

14. Method for orienting ophthalmic lenses, comprising placing an ophthalmic lens on a support and adjusting the position of the ophthalmic lens by means of optical markings visualised by the visualisation means, wherein the visualisation means are formed by at least one visualisation system according to claim 1.

* * * * *